United States Patent [19]

Nagai

[11] Patent Number: 4,656,652

[45] Date of Patent: Apr. 7, 1987

[54] EMERGENCY WARNING DEVICE FOR USE IN A PARTY LINE TELEPHONE SYSTEM OR THE LIKE

[76] Inventor: Kyoichi Nagai, 1-9-2 Kaminarimon, Taitoh-ku, Tokyo, Japan

[21] Appl. No.: 681,231

[22] Filed: Dec. 13, 1984

[30] Foreign Application Priority Data

Dec. 16, 1983 [JP] Japan ................................ 58-237220

[51] Int. Cl.⁴ ............................................ H04M 11/04

[52] U.S. Cl. ......................................... 379/41; 379/43; 379/48

[58] Field of Search .......... 179/2 A, 5 R, 5 P, 18 HB

[56] References Cited

U.S. PATENT DOCUMENTS

| | | | |
|---|---|---|---|
| 2,504,641 | 4/1950 | Burgener | 179/18 HB |
| 3,428,750 | 2/1969 | Hoffman | 179/5 R |
| 3,767,857 | 10/1973 | Colas et al. | 179/18 HB |
| 3,777,065 | 12/1973 | Galian et al. | 179/2 A |
| 3,801,971 | 4/1974 | Stendig et al. | 179/5 R |
| 3,865,985 | 2/1975 | Stankus | 179/5 P |
| 4,041,242 | 8/1977 | Churchill | 179/2 A |

*Primary Examiner*—Keith E. George

*Attorney, Agent, or Firm*—Oldham, Oldham & Weber Co.

[57] ABSTRACT

An emergency warning device comprises an alarm signal circuitry incorporated in the telephone lines of various telephone systems such as an existing party-line telephone system, or interphone system and it is adapted to issue an alarm call in case of emergency. The control circuitry provides a warning message of a state of emergency affairs that can be given to a user by a party-line telephone or the like in case of emergency.

2 Claims, 1 Drawing Figure

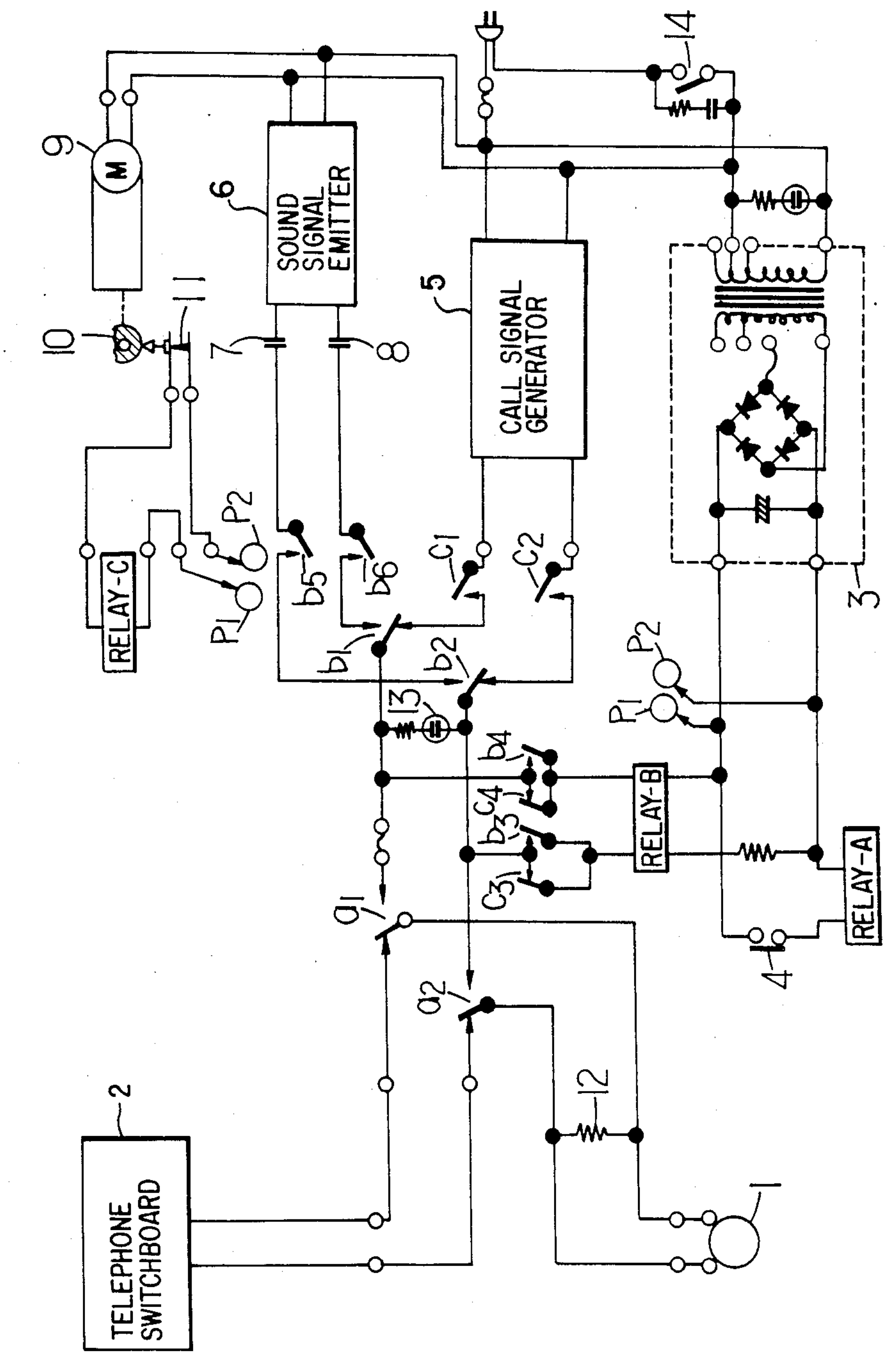
TELEPHONE SWITCHBOARD
CALL SIGNAL GENERATOR
SOUND SIGNAL EMITTER
RELAY-A
RELAY-B
RELAY-C
M

EMERGENCY WARNING DEVICE FOR USE IN A PARTY LINE TELEPHONE SYSTEM OR THE LIKE

BACKGROUND OF THE INVENTION

This invention relates to an emergency warning device utilizing an existing telephone system.

In general, hotels, hospitals or protective institutes having many private rooms are provided, for example, at prescribed positions of the passageway therein with emergency warning bells which are adapted to give warning when an emergency such as a fire arises. However, the emergency warning bells disposed along the passageway are insufficient to call of a sleeping person in a closed private room to an emergency. If a warning means is installed inside every private room, it will allay the aforementioned apprehensions; nevertheless, such a warning system which requires specific wiring work inevitably turns out to be very expensive, has the possibility of marring the apparance of the room, and necessitates routine maintenance and inspection of distributing wires stretched lengthily.

SUMMARY OF THE INVENTION

It is an object of the present invention to provide an emergency warning device which is readily applicable to buidings or facilities of every kind by utilization of an existing telephone or interphone system being already installed therein without need to execute specific wiring work, or utilizes an interphone or a party line telephone as an emergency warning means.

It is another object of the present invention to provide an emergency warning device capable of giving a warning message in case of emergency by utilization of an existing telephone system.

In order to achieve the object described above according to the present invention, there is provided an emergency warning device incorporated in a-party line telephone system or an interphone system, which comprises an alarm signal circuitry composed of a call signal generator for ringing the bell, or the like, and a sound emitting means such as a speaker for giving a warning message of a state of emergency, a first switching means for switching the telephone system from the normal communication state to the emergency state when a thermal sensitive switch is activated in case of emergency, and a second switching means for switching the aforementioned alarm signal circuitry from the state connected with the call signal generator to the state connected with the sound emitting device while the telephone system is kept in its normal communication state.

Merely by incorporating some switching means of the warning device of the present invention in the existing telephone system such as an interphone line or a party line, will form an emergency warning system which is capable of providing reliable and effective alarm operation in case of emergency and obviates the necessity of specific additional wiring work. Thus, the emergency warning device according to this invention can utilize an interphone or a party line telephone as an emergency alarm means and therefore, be readily applicable to the existing telephone system.

BRIEF EXPLANATION OF THE DRAWING

Other objects and characteristic features of this invention will become apparent to those skilled in the art as the disclosure is made in the following description of preferred embodiment as illustrated in the accompanying drawing.

In the drawing, the single FIGURE is a schematic diagram of one form of electric circuit embodying the invention.

DESCRIPTION OF THE PREFERRED EMBODIMENT

In the drawing, reference numeral 1 denotes a party line telephone or an interphone, which is connected with a telephone switchboard 2 for exchange through common telephone lines. In a pair of cables consituting one telephone line, changoever switches a1 and a2 are incorporated in parallel to each other near the telephone switchboard 2. The switches a1 and a2 have transfer contacts each functioning as a passive element of a first relay A connected in series to a thermal sensitive switch 4 in an output circuit of a direct-current (DC) power source circuit 3. These switches a1 and a2 assume its normal state in which telephonic communication can be carried out under ordinary circumstances.

When the switches a1 and a2 are operated to turn to the emergency state in case of emergency, the circuitry connected with the telephone 1 is formed as an alarm signal circuitry. That is to say, the alarm signal circuitry comprises a call signal generator 5 capable of issuing an alarm call of alternating current of about 16 to 20 Hz and a sound emitting device 6 composed of a tape recorder, a voice synthesizer or the like.

To selectively connect the alarm signal circuitry with the telephone 1 by changing the switches a1 and a2 in an emergency, a second relay B is interposed between the paired switches a1 and a2 and the aforesaid DC power source circuit 3. The second relay B is of a double coil type and arranged in a series relative to the DC power source circuit 3. Additionally, the circuit between the second relay B and the paired switches a1 and a2 incorporates break contact switches c3 and c4 of a third relay C which will be described afterward. The break contact switches c3 and c4 are arranged in a serial relative to the second relay B. The second relay B has two transfer contact switches 63 and 64 of a self-induced make type which are adapted for switching over the aforementioned call signal generator 5 to the sound signal emitting device 6 or vice versa and arranged in parallel to the break contact switches c3 and c4.

The transfer contact switches b1 and b2 are kept at the positions connected with the call signal generator 5 under normal conditions, and turned to the opposite state when activated in an emergency, thereby to form a connection circuit to the sound signal emitting device 6. The second relay B is further composed of another pair of make contact switches b5 and b6 which are incorporated together with condensers 7 and 8 for removing the direct current component in the signal current output from the sound emitting device 6.

Also, the make contact switches c1 and c2 are connected in series to the output terminals of the call signal generator 5.

The third relay C is intermittently effected in response to a control current intermittently supplied thereto from the aforementioned DC power source circuit 3 through a microswitch 11 which is controlled by means of a cam plate 10 driven by a constant-speed motor 9. The intermittent action of the third relay C depends on the revolution speed and the arc length of the cut segment portion of the cam plate 10, and is preferably determined so that the control current is repeatedly supplied to the third relay C for about 3 to 5 seconds at regular time intervals of about 1 second.

Denoted by 12 is a resistor for adjusting the sensitivity of the control circuit. In the case where the multiplicity of telephones 1 (for example, 50 telephones per one system block) is used and the warning circuits described above for the respective telephones are arranged in series, the resistance value of the resistor 12 incorporated in each warning circuit is determined in accordance with the resistance of the circuit line connected to the corresponding telephone, that is to say, the resistance of the resistor is in the range of 100 to 600Ω, preferably.

Denoted by reference numeral 13 is a pilot lamp for emitting a warning light signal in case of emergency, P1 and P2 are connection points, and 14 is a power switch. To the respective relays A, B and C, there are added known auxiliary circuits (not shown) such as recovery delay controllers composed of diodes and other elements.

In the warning device of the construction described above according to the present invention, the DC power source circuit 3, the call signal generator 5, the sound emitting device 6, the constant-speed motor 9 and so on are operated when the power switch 14 is turned on. At this time, if the circumstances are normal, the thermal sensitive switch 4 is open and the first relay A is kept in its inoperative state to permit the changeover switches a1 and a2 which serve as transfer contact switches to establish an electrical connection between the telephone switchboard 2 and the telephone 1. As a result, the telephone 1 can be used as an extension telephone or interphone under the control of the telephone switchboard 2.

On the other hand, the cam plate 10 which is rotated by the aforementioned constant-speed motor 9 effects intermittent opening-closing actions of the microswitch 11 to activate and deactivate intermittently the third relay C. In particular, each contact switch of the third relay C offers such a switching behavior that the paired make contact switches c1 and c2 and the paired break contact switches c3 and c4 are alternately activated and deactivated, and consequently, the direct current output from the DC power source circuit 3 and the alternating current output from the call signal generator 5 do not interfere each other under the illustrated condition.

Then, the thermal sensitive switch 4 is turned on because of a fire, for example, with the result that the first relay A is activated to change the switches a1 and a2 to an opposite state in which the telephone 1 is brought into connection with the alarm circuitry. Accordingly, if the third relay C is in its operative state at that time or when the third relay C has assumed its operative state, the make contact switches c1 and c2 connected with the output terminals of the call signal generator 5 are turned on so as to apply a call signal to the telephone 1 and ring it. Under this condition, the break contact switches c3 and c4 are open thereby to prevent the call signal generator 5 and the DC power source circuit 3 from interfering with each other.

The alarm call issued from the telephone 1 is intermittently repeated in an emergency under the control of the third relay C. Then, when the user comes to the phone 1, and the third relay C comes to an inoperative OFF state causing the break contact switches c3 and c4 to close and simultaneously, the second relay B is activated by the direct current fed from the DC power source circuit 3 through off-hook telephone 1, thereby causing the self-induced make contact switches b3 and b4 to close. Furthermore, the transfer contact switches b1 and b2 are turned and the make contact switches b5 and b6 come to a closed state, with the result that a warning message is given from the sound signal emitting device 6 which has been already operated since the emergency arises. The warning message is continuously given to the user by telephone until the phone is replaced because the second relay B is effected, regardless of the action of the third relay C. At this time, high-frequency components included in the warning message thus given are prevented from flowing into the DC power source circuit 3 owing to the second relay B, and the direct current components thereof are also prevented from flowing into the sound emitting device 6 owing to the condensers 7 and 8.

In brief, the emergency alarm device of the present invention which comprises a changeover switch means is provided in the telephone line so as to enable the connecting relation of the telephone to be changed from the switchboard of an extension telephone system, for example, to the alarm signal circuitry under the control of the relays which are activated by means of the thermal sensitive switch when an emergency such as a fire arises. According to this invention, the telephone can be switched to the state connected with the alarm signal circuitry whenever an emergency such a fire arises no matter whether the user is on the phone or not. Thus, if the telephone rings and the user answers. it, a warning message may be given to the user by telephone.

As described above, the present invention brings about marked effects in that an emergency warning system which excels in alarm ability can be provided at a low price because this system can be installed in many private rooms by utilization of an existing telephone system without need of specific wiring work. Besides, since a warning message is given to the residents by telephone, they can exactly evalue the state of emergency and appropriately move against the emergent affairs, and therefore, has great practical utility.

Further, the thermal sensitive switch used in the embodiment described above is automatically acted in an emergency. However, this thermal sensitive switch may of course be of any type, for example, a manually operating switch. Preferably, an automatically and manually operating switch may be used as a thermal sensitive switch. Still more, the make contact switches b5 and b6 which are operated by the second relay B may be formed of transfer contacts; and a dummy resistor may be interposed between the normal side contacts of the relay in order to eliminate the drawback suffered by the loadless output of the sound emitting device 6 having its output terminals opened. In this case, especially the switches b5 and b6 are necessary, whereas these switches are no longer required when no dummy resistor is used.

What is claimed is:

1. An emergency warning device incorporated in a party line telephone system or an interphone system which comprises:

an alarm signal circuitry having a call signal generator for ringing the bell of a telephone or the like and a sound signal generating means for giving a warning message of a state of emergency;

a first switching means for switching the telephone system from its normal communication state in which the telephone system is connected with a telephone switchboard to its emergency state in which the telephone system is connected with an alarm circuitry output when a thermal sensitive switch is activated in case of emergency;

a second switching means, including actuating means, for switching said alarm signal circuitry from its normal communication state in which the alarm signal circuitry output is connected with said call signal generator to its emergency state in which the alarm signal circuitry output is connected with said sound signal generating means;

an intermittently actuated relay; and a circuit actuated by the relay and incorporating a first switch which is connected in series to said call signal generator so as to intermittently issue an alarm call and a second switch having a pair of break contact switches arranged in series between the telephone system and the actuating means of said second switch means to actuate said second switch means to its emergency state if a telephone set goes off-hook and a pair of self-induced make contact switches connected in parallel to said break contact switches of said second switch to hold said second switch means in its emergency state.

2. An emergency warning device for use with a party line telephone system or an interphone system, which comprises:

an alarm signal circuitry including a call signal generator for ringing the bell of a telephone or the like and a sound signal generating means for giving a warning message of a state of emergency;

a control switch;

a first switching means for switching the telephone system from its normal communication state in which the telephone system is connected with a telephone switchboard to its emergency state in which the telephone system is connected with said alarm circuitry output when said control switch is activated;

a second switching means, having actuating means for switching said alarm signal circuitry from its normal communication state in which the alarm signal circuitry output is connected with said call signal generator to its emergency state in which the alarm signal circuitry output is connected with said sound signal generating means;

an intermittently actuated relay; and a circuit actuated by said relay and incorporating a first switch which is connected in series to said call signal generator so as to intermittently issue an alarm call and a second switch having a pair of break contact switches arranged in series between the telephone system and the actuating means of said second switch means to actuate said second switch means to its emergency state if a telephone goes off-hook and a pair of self-induced make contact switches connected in parallel to said break contact switches of said second switch to hold said second switch means in its emergency state.

* * * * *